(12) United States Patent
Gvily

(10) Patent No.: US 7,426,513 B2
(45) Date of Patent: *Sep. 16, 2008

(54) CLIENT-BASED OBJECTIFYING OF TEXT PAGES

(75) Inventor: Yaniv Gvily, Morgan Hill, CA (US)

(73) Assignee: SAP Portals Israel Ltd., Ra' Anana (IL)

( * ) Notice: Subject to any disclaimer, the term of this patent is extended or adjusted under 35 U.S.C. 154(b) by 248 days.

This patent is subject to a terminal disclaimer.

(21) Appl. No.: 09/797,401

(22) Filed: Mar. 1, 2001

(65) Prior Publication Data

US 2002/0065955 A1 May 30, 2002

Related U.S. Application Data

(60) Provisional application No. 60/240,521, filed on Oct. 12, 2000.

(51) Int. Cl.
*G06F 17/30* (2006.01)
*G06F 17/00* (2006.01)
*G06F 15/16* (2006.01)

(52) U.S. Cl. .................. 707/10; 707/3; 707/104.1; 707/200; 715/205; 715/234; 715/235; 709/203; 709/218; 709/219

(58) Field of Classification Search .............. 707/1–10, 707/104.1, 100–102, 200–201; 715/513, 715/515, 501.1, 205, 215, 234, 235; 709/201–203, 709/217–219
See application file for complete search history.

(56) References Cited

U.S. PATENT DOCUMENTS

| 5,572,643 | A | * | 11/1996 | Judson | 709/218 |
|---|---|---|---|---|---|
| 5,646,997 | A | * | 7/1997 | Barton | 713/176 |
| 5,710,900 | A | * | 1/1998 | Anand et al. | 715/764 |
| 5,752,022 | A | * | 5/1998 | Chiu et al. | 707/10 |
| 5,835,712 | A | * | 11/1998 | DuFresne | 709/203 |
| 5,848,424 | A | * | 12/1998 | Scheinkman et al. | 715/501.1 |
| 5,870,546 | A | | 2/1999 | Kirsch | |
| 5,890,171 | A | * | 3/1999 | Blumer et al. | 715/501.1 |
| 5,961,601 | A | * | 10/1999 | Iyengar | 709/229 |
| 6,003,040 | A | | 12/1999 | Mital et al. | |
| 6,006,265 | A | | 12/1999 | Rangan et al. | |
| 6,044,385 | A | * | 3/2000 | Gross et al. | 715/526 |
| 6,092,074 | A | | 7/2000 | Rodkin et al. | |
| 6,098,069 | A | * | 8/2000 | Yamaguchi | 707/102 |
| 6,101,510 | A | * | 8/2000 | Stone et al. | 715/513 |
| 6,122,647 | A | | 9/2000 | Horowitz et al. | |

(Continued)

OTHER PUBLICATIONS

Liu, L. et al.; "XWRAP: An XML-enabled Wrapper Construction System for Web Information Services"; 2000, *16th International Conference on Data Engineering Proceedings*, pp. 611-621.

Sanz, Ismael et al.; "Gathering Metadata from Web-Based Repositories of Historical Publications"; 1998, *Nineth International Workshop on Database and Expert Systems Applications*, pp. 473-478.

Weibel, S.; "A Proposed Convention for Embedding Metadata in HTML"; 1996, *Internet Citation, W3C Distributed Indexing Workshop*, 3 pages.

*Primary Examiner*—Miranda Le
(74) *Attorney, Agent, or Firm*—Buckley, Maschoff & Talwalkar LLC

(57) ABSTRACT

The invention relates to providing embedded meta-data into HTML pages by means of a plug-in residing on a user computer. The plug-in analyzes the unstructured data of a hypertext page, understands the meaning behind the data, associates meta-data with some of the unstructured data and stores this meta-data back into the original hypertext page. The plug-in stores meta-data in a location that is hidden from the user's view so that it is unobtrusive but easily retrievable.

35 Claims, 6 Drawing Sheets

U.S. PATENT DOCUMENTS

| | | | | |
|---|---|---|---|---|
| 6,138,162 | A * | 10/2000 | Pistriotto et al. | 709/229 |
| 6,141,759 | A * | 10/2000 | Braddy | 726/14 |
| 6,151,624 | A * | 11/2000 | Teare et al. | 709/217 |
| 6,199,081 | B1 * | 3/2001 | Meyerzon et al. | 715/513 |
| 6,286,043 | B1 * | 9/2001 | Cuomo et al. | 709/223 |
| 6,292,813 | B1 * | 9/2001 | Wolfe | 715/513 |
| 6,338,059 | B1 * | 1/2002 | Fields et al. | 707/4 |
| 6,392,668 | B1 * | 5/2002 | Murray | 715/738 |
| 6,400,381 | B1 * | 6/2002 | Barrett et al. | 345/758 |
| 6,421,065 | B1 * | 7/2002 | Walden et al. | 715/712 |
| 6,441,834 | B1 * | 8/2002 | Agassi et al. | 715/764 |
| 6,448,485 | B1 * | 9/2002 | Barile | 84/609 |
| 6,463,440 | B1 * | 10/2002 | Hind et al. | 707/102 |
| 6,466,937 | B1 * | 10/2002 | Fascenda | 707/10 |
| 6,466,970 | B1 * | 10/2002 | Lee et al. | 709/217 |
| 6,480,842 | B1 * | 11/2002 | Agassi et al. | 707/4 |
| 6,490,601 | B1 * | 12/2002 | Markus et al. | 715/507 |
| 6,505,219 | B1 * | 1/2003 | MacLean et al. | 715/530 |
| 6,516,312 | B1 * | 2/2003 | Kraft et al. | 707/3 |
| 6,519,568 | B1 * | 2/2003 | Harvey et al. | 705/1 |
| 6,529,910 | B1 * | 3/2003 | Fleskes | 707/10 |
| 6,564,254 | B1 * | 5/2003 | Shoji et al. | 709/217 |
| 6,571,253 | B1 * | 5/2003 | Thompson et al. | 707/103 |
| 6,571,279 | B1 * | 5/2003 | Herz et al. | 709/217 |
| 6,701,376 | B1 * | 3/2004 | Haverstock et al. | 709/246 |
| 6,725,424 | B1 * | 4/2004 | Schwerdtfeger et al. | 715/513 |
| 6,757,744 | B1 * | 6/2004 | Narisi et al. | 709/250 |
| 6,763,499 | B1 * | 7/2004 | Friedman et al. | 715/513 |
| 6,772,139 | B1 * | 8/2004 | Smith, III | 707/3 |
| 6,785,659 | B1 * | 8/2004 | Landsman et al. | 705/14 |
| 6,823,076 | B2 * | 11/2004 | Cahill et al. | 382/100 |
| 6,823,366 | B1 * | 11/2004 | Nakano | 709/206 |
| 6,829,746 | B1 * | 12/2004 | Schwerdtfeger et al. | 715/523 |
| 6,944,817 | B1 * | 9/2005 | Danneels | 715/513 |
| 7,089,566 | B1 * | 8/2006 | Johnson | 719/328 |
| 7,227,971 | B2 * | 6/2007 | Nagao | 382/100 |
| 2001/0023436 | A1 * | 9/2001 | Srinivasan et al. | 709/219 |
| 2003/0033298 | A1 * | 2/2003 | Sundaresan | 707/5 |

\* cited by examiner

CLIENT-BASED OBJECTIFYING OF TEXT PAGES

BACKGROUND OF THE INVENTION

This application claims priority to Provisional Application Number 60/240,521 filed Oct. 12, 2000, hereby incorporated by reference for all purposes. In addition, this application is being concurrently filed with U.S. Ser. No. 09/797,318 commonly assigned and hereby incorporated by reference for all purposes.

The World Wide Web is an integrated network of sites, each is specialized in a different subject or theme. Despite the differences, most sites can be categorized into groups based upon their content. Some sites specialize in news, some in sports, others in book e-tailing and still others in investment.

Navigation between the various sites is limited to clicking on hyperlinks. Hyperlinks in one site point to pages on another thus allowing the browser to move among the sites. This method of navigation is powerful yet it also limits the user's browsing experience. One online bookseller will not point to another since it does not want to move potential buyers off its site. The offered hyperlinks will be limited only to websites that the site has relations with. The user that browses for a book, however, does want to be able to compare prices on multiple competitive online bookstores.

Hypertext pages viewed over the World Wide Web are free-form text documents. They are not self descriptive in the way that they do not contain the meaning of the displayed text. It is up to the reader of the site to interpret the text into meaningful information. This all works well for a human reader. However, a machine reading this text (data) is lacking the necessary descriptors (meta-data) to understand what is being displayed.

Therefore, it would be advantageous to provide a method of analyzing the unstructured data of hypertext pages, understanding the meta-data behind it and embedding this meta-data into the original hypertext page at the client's machine. The meta-data may be stored, hidden from the user's view, so that it is unobtrusive. However, applications that know where to look for this meta-data can easily access and utilize it.

SUMMARY OF THE INVENTION

The invention relates to embedding meta-data into HTML pages at a user computer. In one embodiment, a computer-implemented method for adding meta-data to textual content on a hypertext page is described. A plug-in residing on a web browser at a user computer detects the occurrence of a first hypertext page. The plug-in analyzes the URL of the first hypertext page. Soon thereafter, the plug-in associates a template with the first hypertext page based in part on said URL. If the plug-in cannot locate a template locally, it may contact a well-known server so as to request a template from the server, which is coupled to a repository of templates.

The plug-in then scans the content of the first hypertext page for recognized objects using the template. In response to locating any recognized objects, the plug-in dynamically embeds meta-data of the recognized object into the first hypertext page. The first hypertext page with the meta-data is then stored on the user computer or displayed to the user.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
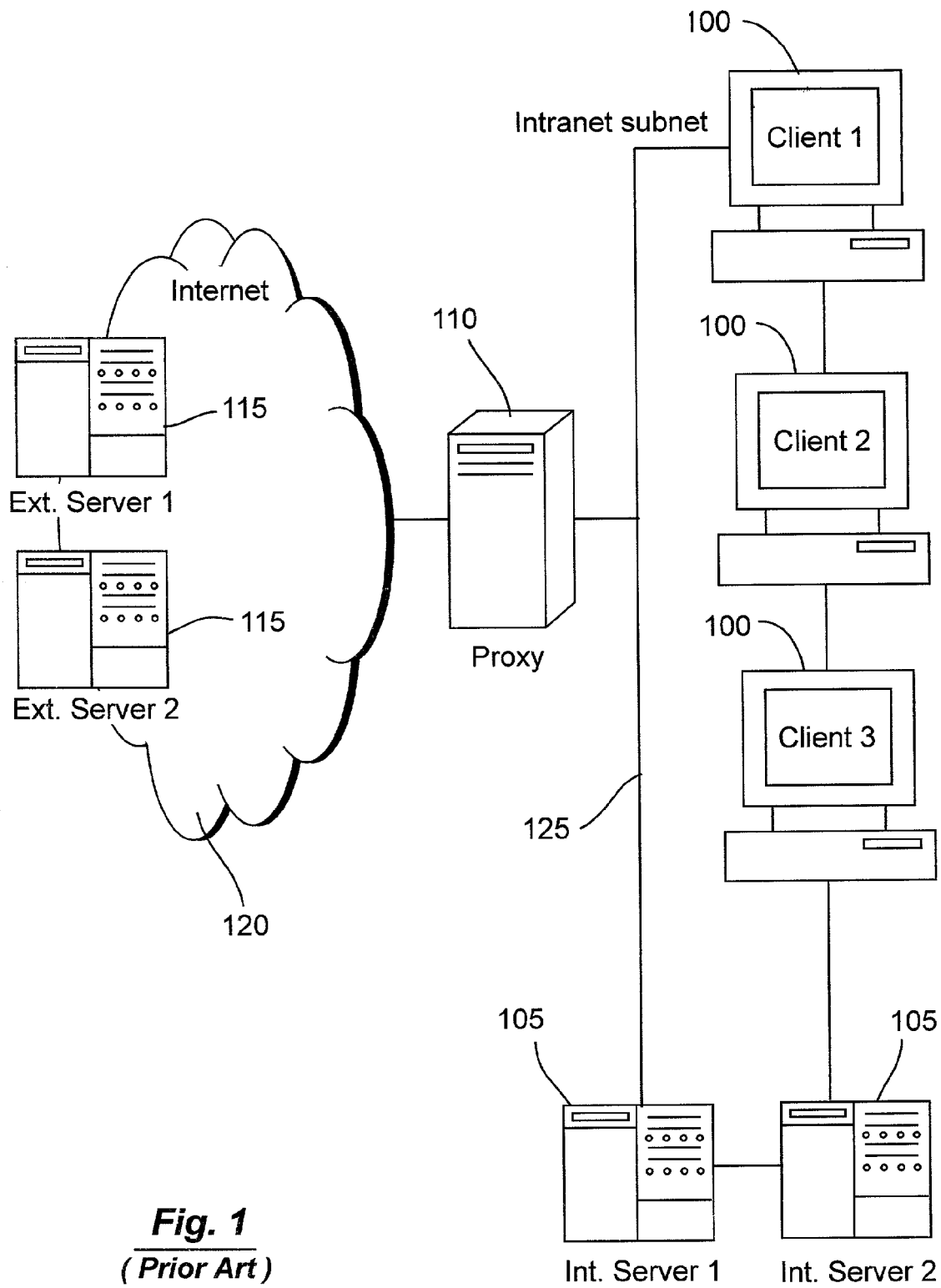
FIG. 1 is a prior art corporate network.

The invention provides exemplary systems and methods for embedding meta-data into HTML pages by means of a plug-in associated with a web browser and thereafter displaying the HTML pages on a user computer. The plug-in analyzes the unstructured data of a hypertext page, understands the meaning behind the data, associates meta-data with some of the unstructured data and stores this meta-data back into the original hypertext page. The invention potentially stores meta-data in a location that is hidden from the user's view so that it is unobtrusive but easily retrievable.

There are numerous configurations for implementing the present invention. In the illustrated embodiment of FIG. 1, the invention is implemented and described using a typical corporate network. Client computers 100 are arranged in intranet subnet 125 along with internal servers 105. The intranet subnet is coupled to Internet 120 through a gateway or bottleneck 110. In the illustrated example, gateway 110 is a proxy. Internet 120 has external servers 115, which is where content may reside.

Figure 2:
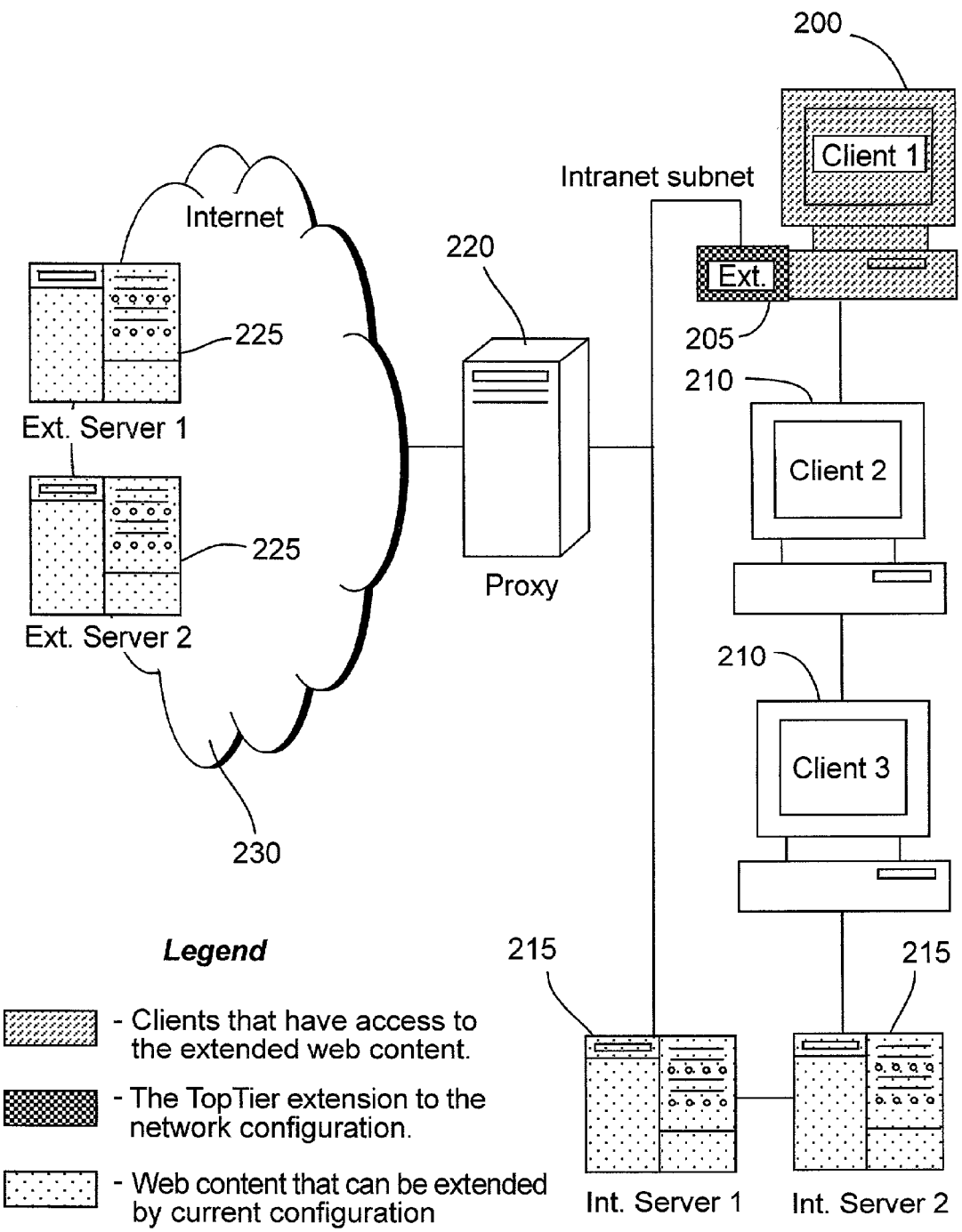
FIG. 2 is one embodiment of a network embodying the present invention.

FIG. 2 illustrates one embodiment of client based embedding of data for the network shown in FIG. 1. The illustrated example in FIG. 2 extends the client machine so as to have access to extended web content. Client machine 200 has an extension 205 installed thereon, which allows content coming from both internal servers 215 and external servers 225 to be extended. Although the network illustrated in FIG. 2 does not require modification of the network configuration to embed data into a text page, it does require an installation or plug-in on each client to do so. As will be described hereinafter, client machine 200 has embodied thereon an extension to embed data into a text page. In one embodiment, this extension is a web browser having a plug-in that performs the steps of the method described hereinafter.

Embedding Data at a Client Machine

Figure 3:
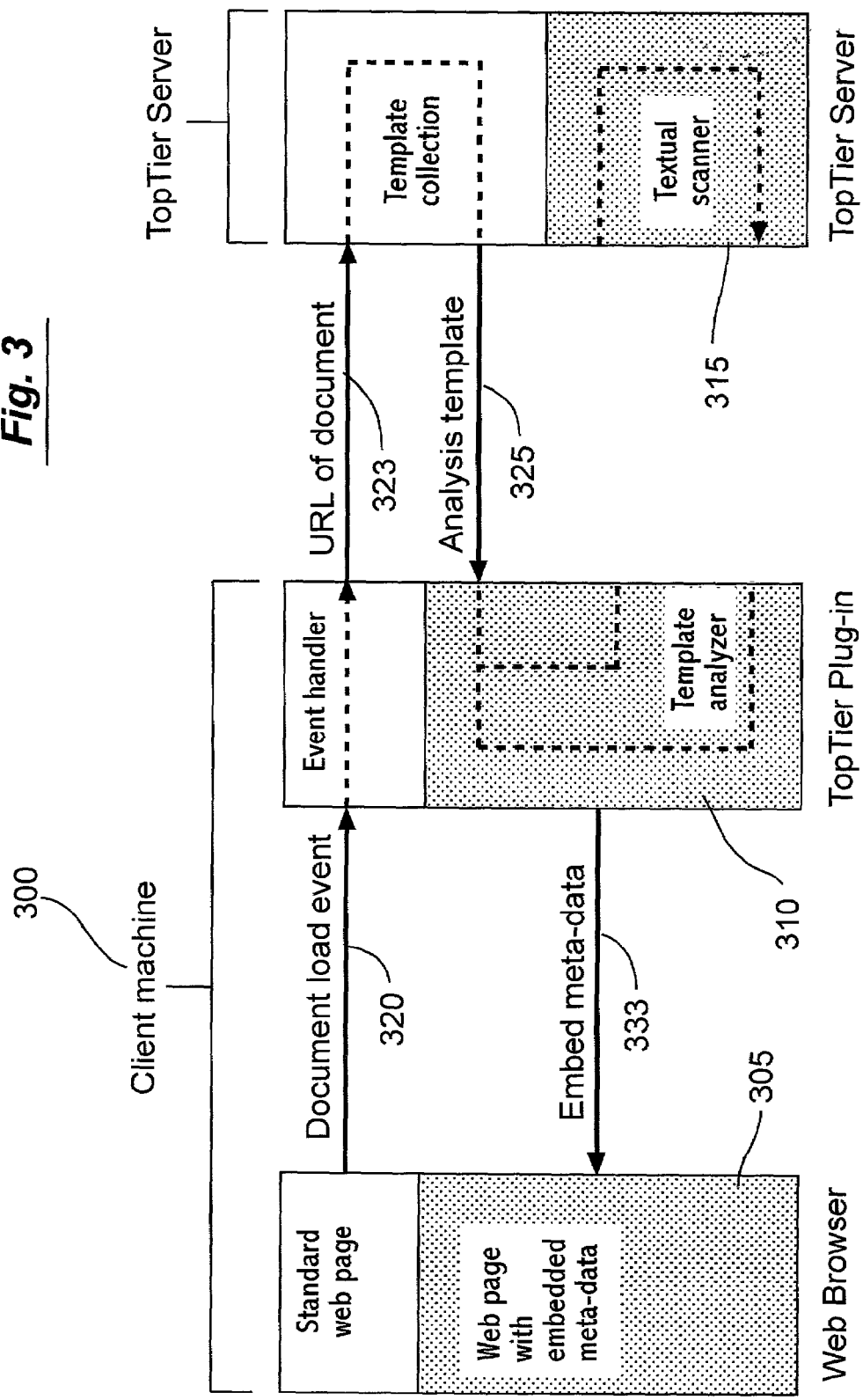
FIG. 3 is a one embodiment of a network embodying the present invention by providing a plug-in at the client machine.
Figure 3A:
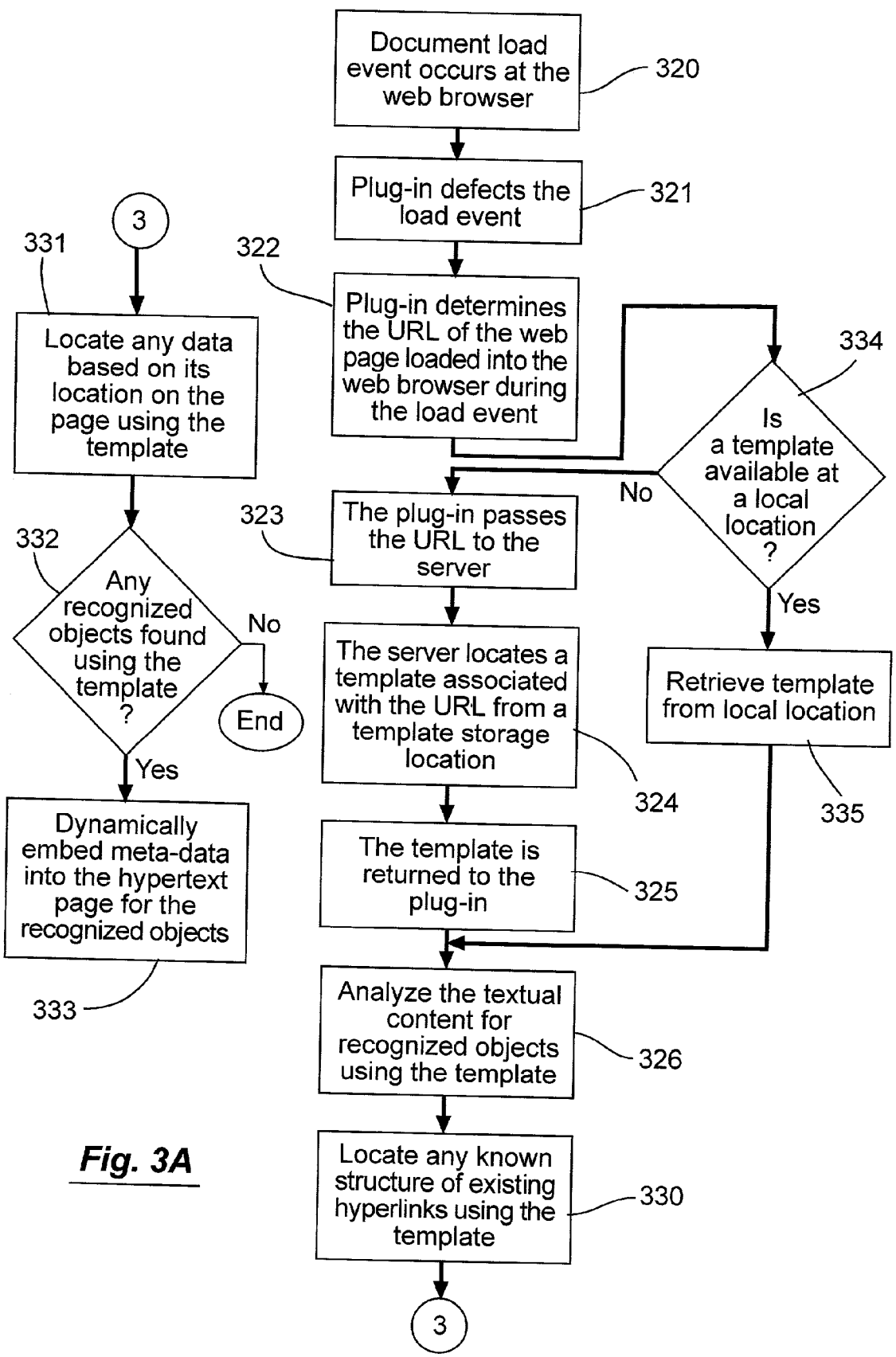
FIG. 3A is a flow chart of the steps for the embodiment of FIG. 3.
Figure 4:
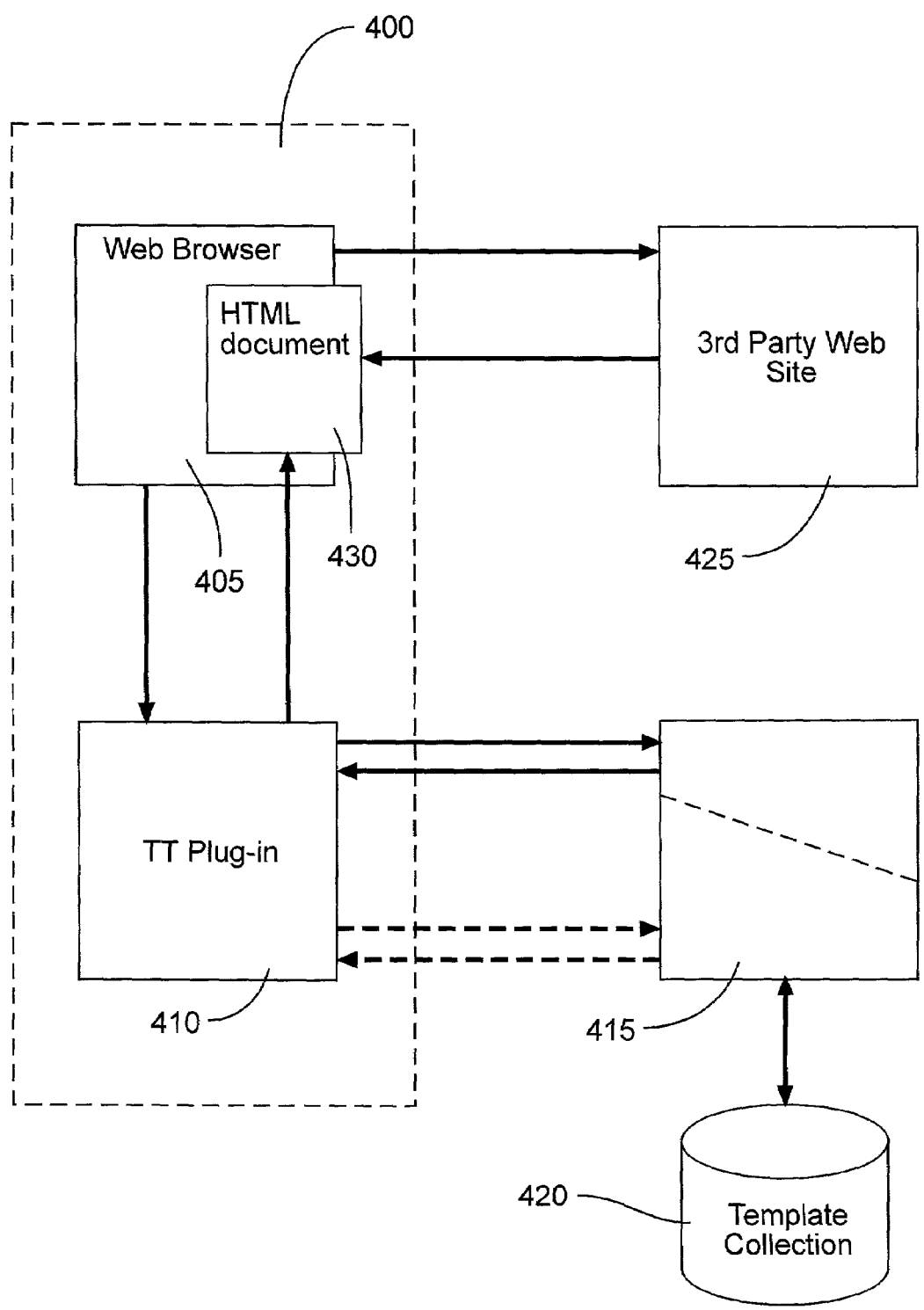
FIG. 4 is a system drawing for providing a plug-in at a client machine.

In one embodiment of the present invention, a plug-in, filter, tool bar or event handler is provided at the client machine to embed data into a text page. More particularly, as shown in FIGS. 3 and 4, a plug-in is provided that may embed meta-data into a web page at a client machine. Referring now to FIGS. 3 and 3A, client machine 300 comprises a web browser 305 and a plug-in 310 embodied thereon. Client machine 300 is coupled to a server 315, which in the illustrated embodiment is shown as a TopTier server. Server 315 has a database of templates coupled thereto, which is not illustrated in FIG. 3.

Referring now to FIG. 3A with reference to FIG. 3, one embodiment of the present invention will now be described in detail. A user generates an HTTP request by entering a URL into a web browser 305 at client machine 300. The HTTP request is submitted to a second location, which in the example is likely to be a third party website. In the context of the present invention, either the entering of an HTTP request or the receipt of the corresponding document may be referred to as a document load event. Web browser plug-in 310 detects the HTTP request or document load event (step 321). Subsequently, the HTTP request is intercepted at client machine 300. The resource identifier, which in the illustrated example is the URL of the web page requested at the user computer or client machine 300, is extracted from the request by the plug-in and stored for future use (step 322). If a template is not available locally, the URL is then forwarded (step 323) from client machine 300 to a server 315 for purposes of locating a template. If a template is available locally, for example in computer readable memory or in a database coupled to client machine 300, the template is retrieved and there is no need to send the URL to server 315. Any located template is associated with the URL of the HTTP request.

In response to the receipt of the URL, server 315 queries its database of templates, to identify any relevant template for the target resource, i.e. the forwarded URL in step 323 (step 324). If a match is found, server 315 returns the template to the plug-in 310. The client machine, through web browser 305 and plug-in 310, analyzes the document. In one embodiment, using the template, the plug-in scans the textual content to search for recognized objects (step 326). In another embodiment, the plug-in may use the template to locate any known pattern or structure of existing hyperlinks (step 330). In yet another embodiment, the plug-in uses the template to locate any recognized objects based on their relative location on the page (step 331).

To facilitate its operation, the plug-in of the present invention may parse the HTTP response to build a Document Object Model (DOM) document. DOM is a platform and language neutral interface that allows programs and scripts to dynamically access and update the content and structure of HTML documents. As such, all document content, including all elements and their attributes, can be added, removed or changed.

Client machine 300, using plug-in 310 embodied on web browser 305, then analyzes the DOM document based on any retrieved template(s), and if recognized objects are found using the template (step 332), thereafter embeds meta-data into the DOM document in the form of new DOM nodes. Embedded data may be meta-data, a script or a link to name a few. The DOM is then serialized again as plain HTML text and returned to the web browser (step 333). The web browser is unaffected by the fact that the HTML content has been modified.

The process of analyzing the existing DOM of an HTML page is now described. In one aspect of the invention, the textual content of the HTML page is scanned for known words or phrases. This scanning phase may be referred to as the dictionary analysis. For example, the word "United States" is identified as a location and a country. Once identified, plug-in 310 subsequently inserts this meta-data into the HTML stream. Different dictionaries may be used for different sites. For example, a first dictionary may always be used for a sports site, while a second dictionary may be used for a news site. In another aspect of the invention, the known structure of existing hyperlinks and other elements are analyzed and extended. For example, http://www.mybookstore.com/book? isbn=1234567890 points to a book whose ISBN is 1234567890. Accordingly, links are analyzed differently for each domain. In yet another aspect of the invention, data is recognized by its location on the page. For example, a particular web page may always use big text at the top of a page to identify a book title. A template of the present invention may then be used to scan this particular web page and extract the title of the book. Accordingly, there are different templates that recognize text by location for each recognized domain.

FIG. 4 illustrates one example of a system embodying the present invention. In the illustrated example, client machine 400 comprises a web browser 405 with a plug-in 410 embodied thereon. In addition, client machine 400 may also have a word processing program, a spreadsheet or document management system with an associated filter embodied thereon to effectuate the steps of the present invention. Client machine 400 initiates a request for a document from a first location 425, which in the illustrated example is an HTTP request to a first location 425. In the illustrated embodiment, first location 425 is a third party website on the Internet. However, one skilled in the art can appreciate that the request for a document may be a request for a document from a word processing program, a spreadsheet, a document management system or the like without departing from the intended scope of the invention. In addition, first location 425 may be an intranet site.

Continuing with FIG. 4, the document is returned from the first location to web browser 405. Client machine 400 utilizes the appropriate software package to display the document to the user. In the illustrated embodiment, web browser 405 detects the presence of HTML document 430 and sends a document load event to plug-in 410. The plug-in parses the document to locate the unique identifier that is characteristic of the document. In the illustrated example, the unique identifier is a URL identifying the HTML document.

Plug-in 410 then requests an associated template for the document by passing the unique identifier to a second location 415. In the illustrated example, second location 415 is a server having a database of templates 420 coupled thereto. The unique identifier, or URL of the HTML document, is used to instruct the server 415 to retrieve the associated template from database 420. However, one skilled in the art can appreciate that second location may be a database or computer readable memory coupled to client machine 400. Second location 415 returns the template to client machine, and more particularly in the illustrated example, plug-in 410. If more information is needed by client 400, it is requested from second location 415.

As illustrated in FIG. 4, plug-in 410 uses the template to analyze HTML document 430. Specifically, plug-in searches the document for recognized objects using the template. If a recognized object is found, plug-in 410 associates data with the recognized element and embeds it into the document. In the illustrated embodiment, plug-in 410 associates meta-data with the recognized objects and embeds the meta-data into the HTML text stream. However, one skilled in the art can appreciate that scripts, links or the like may be embedded into a document without departing from the intended scope of the invention.

Embedding Data Examples

Figure 5:
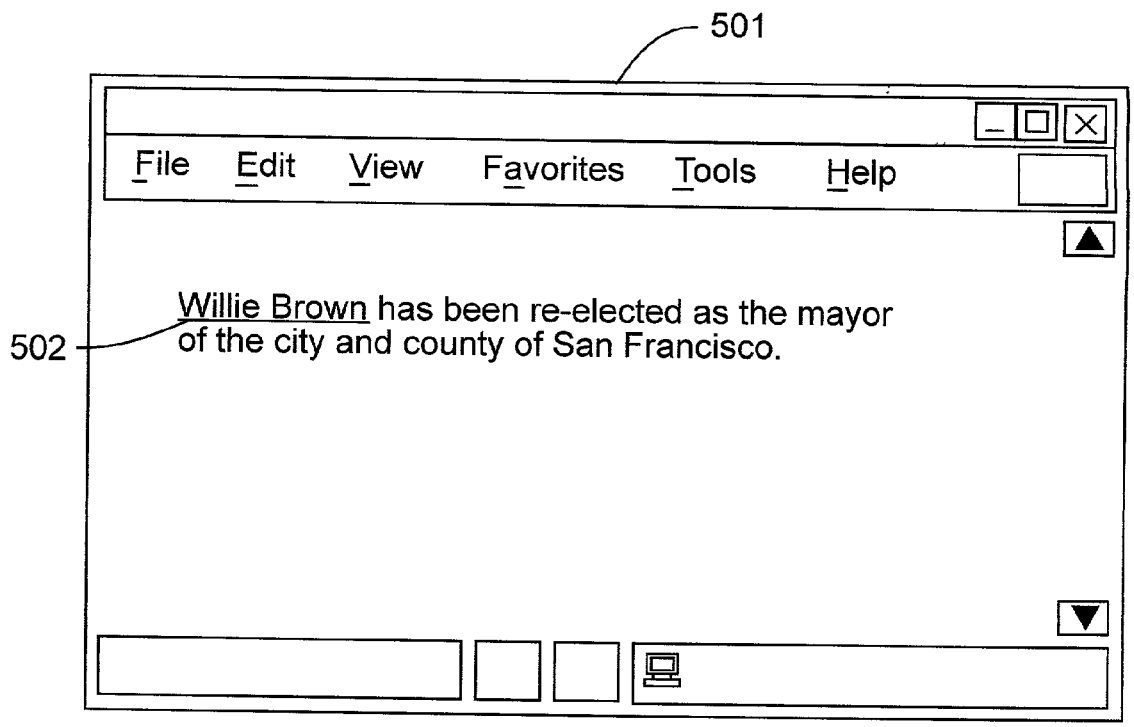
FIG. 5 is a prior art hypertext page.

FIG. 5 shows an example of a prior art hypertext page 601 consisting of some text and a hyperlink 602. The following illustrates source code that may be used to render that page:

```
<HTML>
<HEAD>
</HEAD>
<BODY>
<A HREF="http://xyz.somewhere.com">Willie Brown</A>has been re-elected as the mayor of the city and county of San Francisco.
</BODY>
</HTML>
```

For purposes of the example, assume that the analysis process for the HTML page has recognized two objects on the page: Willie Brown and San Francisco. Willie Brown is recognized as a name, Willie as a first name and Brown as a last name. Continuing, San Francisco is recognized as a location. The meta-data of these objects will be embedded into the web page, effectively altering the source code to something like:

<HTML>
<HEAD>
</HEAD>
<BODY>
<A HREF="http://xyz.somewhere.com"META="<PERSON><FIRST>Willie</FIRST>
<LAST>Brown</LAST></PERSON>">Willie Brown</A>has been re-elected as the mayor of the city and county of <SPAN META="<LOCATION><CITY>San Francisco </CITY><STATE>CA</STATE></LOCATION>">San Francisco</SPAN>.
</BODY>
</HTML>

The example above shows one case where an attribute has been added to an existing tag, i.e. the META attribute of the A tag. In addition, the example illustrates an attribute in which a new tag has been added where there had been none before, i.e. the SPAN tag. Neither change alters the rendering of the web page. The web browser ignores the additional tags when drawing the page. The user is unaware of the changes to the page. Also, note that since the meta-data is stored in XML format, it is quite easily extensible. As such, it may therefore be desirable to include the country as well as the city and state in the location object in the above example.

A designer of the analysis tool may program one aspect of the invention so as to cause changes in the rendering of the HTML page. For example, an analyzer may automatically add HRNP links where there were none, and alter existing hyperlinks to HRNP links where applicable. HRNP links are described in U.S. Pat. No. 5,848,424, which is hereby incorporated by reference in its entirety for all purposes. In summary, HRNP links provide a method for meta-data based hyperlink navigation. One possible implementation may produce the following code:

<HEAD>
</HEAD>
<BODY>
<A HREF="hrnp://xyz.myserver.com/person/Willie,+Brown">Willie Brown</A>has been re-elected as the mayor of the city and county of <AHREF="hrnp://xyz.myserver.com/city/SF, +CA>">San Francisco</A>.
</BODY>
</HTML>

Since HRNP links have a rigid structure one must follow, the meta-data is not stored in XML style but rather as part of the HRNP HREF string.

Figure 6:
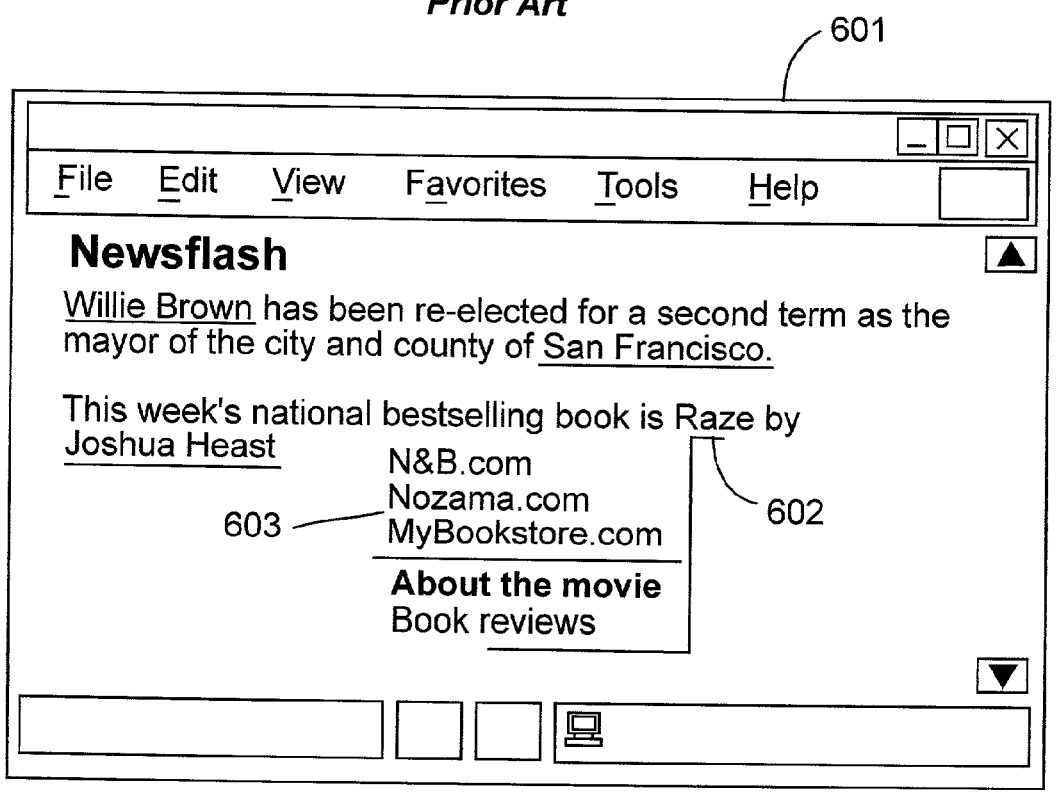
FIG. 6 is a hypertext page having a content menu using the embedded meta-data of the present invention.

FIG. 6 illustrates one example of a navigation option using meta-data embedded into an HTML page. In the illustrated example, a right click on link 602 produces context menu 603. The navigation options provided in context menu 603 result from and are directly related to the embedded meta-data. In the illustrated example, a template has determined that the term "Raze" is a book. In response, corresponding meta-data is embedded into the hypertext page to indicate such. The navigation options in context menu 603, e.g. N&B.com, Nozama.com and Mybookstore.com, all relate to the meta-data that indicates Raze is a book. Such association allows for infinite navigation options.

Although the invention is described with reference to specific embodiments thereof, the embodiments are merely illustrative, and not limiting, of the invention, the scope of which is to be determined solely by the appended claims.

What is claimed is:

1. A computer implemented method for embedding meta-data in a resource, the method comprising:
at a client machine, intercepting a request for the resource;
at the client machine, extracting a resource identifier from the request;
forwarding the request for said resource from said client machine to a location external to said client machine having the resource;
transmitting said resource identifier to a server remote from and external to said client machine, wherein the server is also remote from the location having the resource;
at said server remote from and external to said client machine, using said resource identifier to locate a meta-data template;
returning said meta-data template to said client machine from said server remote from and external to said client machine;
receiving the resource at the client machine;
at the client machine, using said meta-data template to search the resource and identify one or more recognized elements in the resource,
wherein said search and identify said one or more recognized elements comprises a pattern search, wherein said pattern search is a search for a pre-determined pattern of links,
wherein said search and identify said one or more recognized elements further comprises a location search, said location search comprising locating text based on the position of said text in said resource;
at the client machine, embedding meta-data into the resource based on the one or more recognized elements, wherein the meta-data is embedded so as to describe the one or more recognized elements, wherein said embedded meta-data does not alter a rendering of the resource, and further wherein the meta-data is not to be transmitted to the location having the resource; and
at the client machine, providing at least one contextual navigation option to a user based on an action by the user relative to a recognized element and the meta-data embedded with respect to that element.

2. The computer implemented method of claim 1 wherein said method is performed by a module operating within a web browser.

3. The computer implemented method of claim 1 wherein said embedded meta-data comprises a script.

4. The computer implemented method of claim 1 wherein said embedded meta-data comprises a link.

5. The computer implemented method of claim 1 wherein said request for a resource is an HTTP request for an HTML document.

6. The computer implemented method of claim 1 wherein said resource identifier is a URL.

7. The computer implemented method of claim 1 wherein said request for a resource is a request for a document from a document management database.

8. The computer implemented method of claim 1 further comprising the step of storing detected element data in a log file coupled to said client machine, said detected element data representing at least said one or more recognized elements.

9. The computer implemented method of claim 1 wherein said search and identify said one or more recognized elements further comprises a dictionary search, wherein said dictionary search comprises locating recognized words or phrases in said resource from computer memory coupled to said client machine.

10. The computer implemented method of claim 1 wherein said search and identify said one or more recognized elements further comprises a pattern search, said pattern search comprising locating known patterns in said resource.

11. The computer implemented method of claim 1 wherein said storing a resource identifier comprises storing said resource identifier in computer readable memory coupled to said client machine.

12. A computer implemented method for adding meta-data to a hypertext page, the method comprising:
    at a client machine, intercepting an HTTP request for a resource;
    at the client machine, extracting a URL from said HTTP request and storing the URL in computer readable memory coupled to said client machine, the URL identifying the requested resource;
    forwarding the HTTP request from said client machine to a network external to said client machine having the requested resource;
    receiving the requested resource at the client machine in the form of an HTTP response;
    at the client machine, extracting content out of the HTTP response;
    sending the URL to a server remote from and external to said client machine;
    at the server remote from and external to said client machine, locating a meta-data template that corresponds to the URL;
    returning the meta-data template from the server to the client machine;
    at the client machine, using the meta-data template to search the content and identify recognized elements within the content,
        wherein said meta-data template assists a pattern search, wherein said pattern search is a search for a predetermined pattern of links,
        wherein said meta-data template assists a location search, wherein said location search comprises recognizing elements in said resource based on the location of said element in said resource;
    at the client machine, embedding meta-data relating to the recognized elements into the content, wherein the meta-data is embedded so as to describe the one or more recognized elements, wherein said embedded meta-data does not alter a rendering of the resource, and further wherein the meta-data is not transmitted to the network having the resource; and
    at the client machine, providing at least one contextual navigation option based at least in part on a user selection associated with a recognized element and the embedded meta-data associated with that element.

13. The computer implemented method of claim 12, wherein said client machine comprises a web browser and a module operating within said web browser.

14. The computer implemented method of claim 12, wherein said step of embedding meta-data further comprises:
    building a document object model (DOM) using an HTML text stream from said HTTP response;
    adding meta-data into the DOM by creating new DOM elements and attributes; and
    serializing the DOM with the added meta-data into the HTML text stream.

15. The computer implemented method of claim 12 wherein said resource is an HTML stream.

16. The computer implemented method of claim 12 wherein said network is an intranet network.

17. The computer implemented method of claim 12 wherein said network is the Internet.

18. The computer implemented method of claim 12 wherein said network is a document management system.

19. The computer implemented method of claim 12 wherein said meta-data template is obtained from a meta-data template database, said meta-data template is selected based on said URL.

20. The computer implemented method of claim 19 wherein said meta-data template database is coupled to a location having up-to-date meta-data templates, wherein said meta-data template database receives said up-to-date meta-data templates from said location.

21. The computer implemented method of claim 20 wherein said meta-data template database is coupled to a location having said up-to-date meta-data templates, and receives said up-to-date meta-data templates using the Internet.

22. The computer implemented method of claim 12 wherein said meta-data template assists a dictionary search, wherein said dictionary search comprises recognizing elements in said resource by a word or a phrase.

23. The computer implemented method of claim 12 wherein said meta-data template assists a pattern search, said pattern search comprising locating known patterns in said resource.

24. A computer implemented method for adding a script to a hypertext page, comprising:
    intercepting a resource request at a client machine, said resource request identifying a resource;
    at the client machine, extracting a resource request identifier from the resource request and storing the resource request identifier in computer readable memory, the resource request identifier associated with the resource;
    forwarding the resource request from the client machine to a network external to said client machine and thereafter locating the resource;
    forwarding said resource request identifier to a server remote from and external to said client machine;
    at said server remote from and external to said client machine, using said resource request identifier to locate a meta-data template that corresponds to the resource request identifier;
    returning said meta-data template from said server external to said client machine;
    at the client machine, using the meta-data template to identify at least one element within the resource,
        wherein said meta-data template assists a pattern search, wherein said pattern search is a search for a predetermined pattern of links,
        wherein said meta-data template assists a location search, wherein said location search comprises recognizing elements in said resource based on the location of said element in said resource;
    at the client machine, embedding at least one script into said resource, wherein the script is embedded so as to describe the at least one recognized element, wherein said embedded script does not alter a rendering of the resource, and further wherein the script is not transmitted to the network having the resource; and
    at the client machine, providing at least one contextual navigation option to a user based at least in part on the embedded script and a user action performed in connection with the element associated with that script.

25. The computer implemented method of claim 24, wherein said step of embedding at least one script further comprises:
   building a document object model (DOM) out of an HTML text stream from said resource;
   adding at least one script into the DOM by creating new DOM nodes, elements or attributes; and
   serializing the DOM with the at least one added script back into the HTML text stream.

26. The method of claim 24 wherein said network is the Internet.

27. The method of claim 24 wherein said network is an intranet.

28. The method of claim 24 wherein said network is a document management database.

29. The method of claim 24 wherein said document request identifier is a URL.

30. The method of claim 24 wherein said resource is generated from at least one of spreadsheet software, presentation software or word processing software.

31. A computer implemented method for providing navigation options, said method comprising:
   receiving a request for a resource at said client machine;
   extracting and storing a resource identifier from said request at said client machine;
   forwarding said request for said resource from said client machine to a location external to said client machine having said resource;
   forwarding the resource identifier from said client machine to a server remote from said client machine and the location having said resource,
   at said server, using said resource identifier to locate a meta-data template;
   returning the meta-data template to said client machine from said server external to said client machine;
   receiving said resource at said client machine and thereafter parsing said resource based on said identifier;
   at said client machine, using said meta-data template to search said resource and identify one or more recognized elements in said resource,
      wherein said meta-data template assists a pattern search, wherein said pattern search is a search for a predetermined pattern of links,
      wherein said meta-data template assists a location search, wherein said location search comprises recognizing elements in said resource based on the location of said element in said resource;
   embedding meta-data into said resource at said client machine based on said one or more recognized elements, wherein the meta-data is embedded so as to describe the one or more recognized elements, wherein said embedded meta-data does not alter a rendering of the resource, and further wherein the meta-data is not to be transmitted to the location having the resource; and recognizing said meta-data at said client machine and thereafter providing a contextual navigation option at said client machine based on (1) a user action relative to a recognized element and (2) said meta-data associated with that element.

32. The computer implemented method of claim 31 wherein said navigation option comprises a single click hypertext link.

33. The computer implemented method of claim 31 wherein said navigation option comprises an HRNP link, wherein said HRNP link can be clicked at a first location and dragged to a second location.

34. The computer implemented method of claim 31 wherein said navigation option comprises a pop-up menu having a list of links.

35. The computer implemented method of claim 31 wherein said navigation option comprises a list of icons.

* * * * *